UNITED STATES PATENT OFFICE.

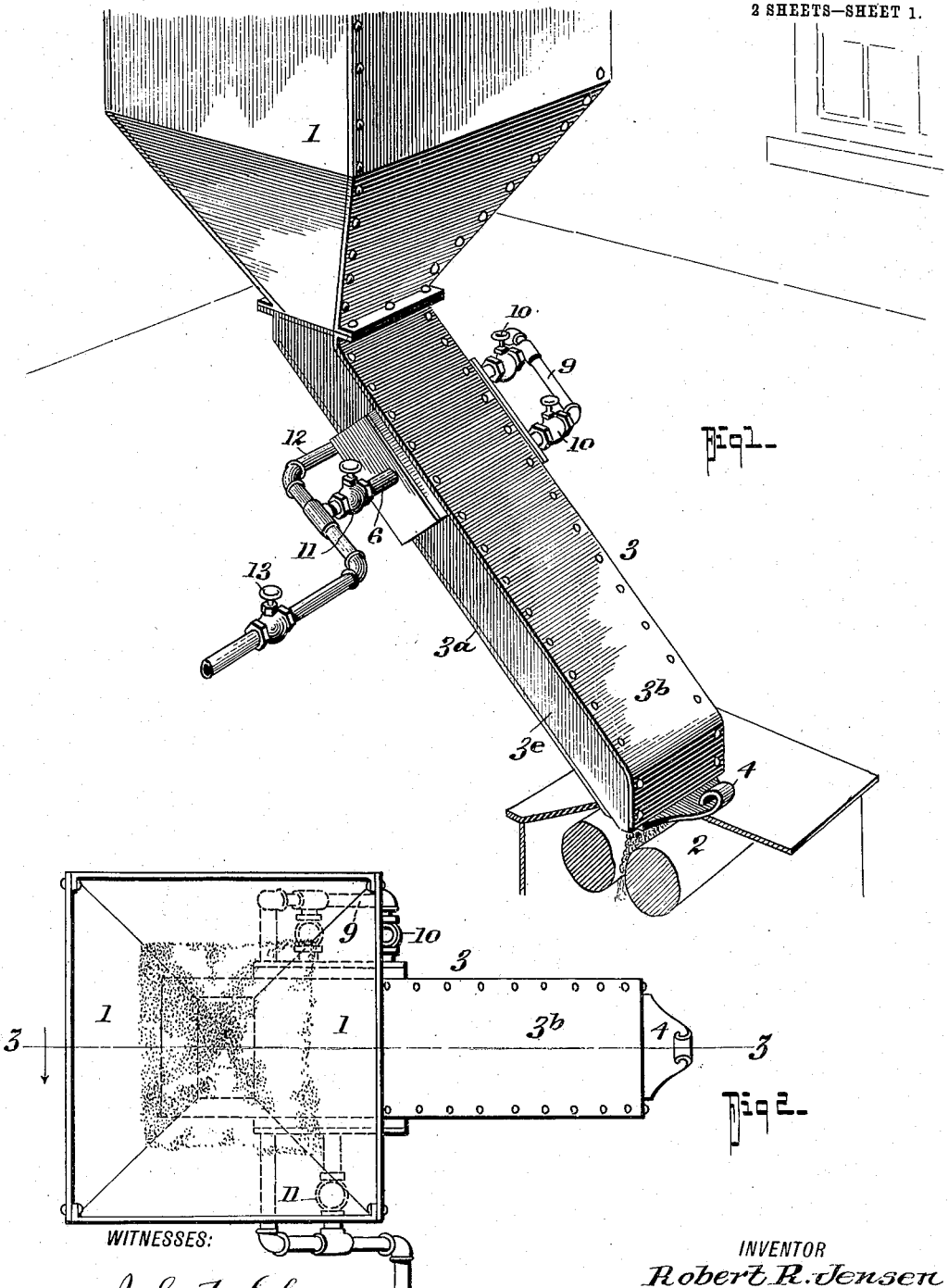

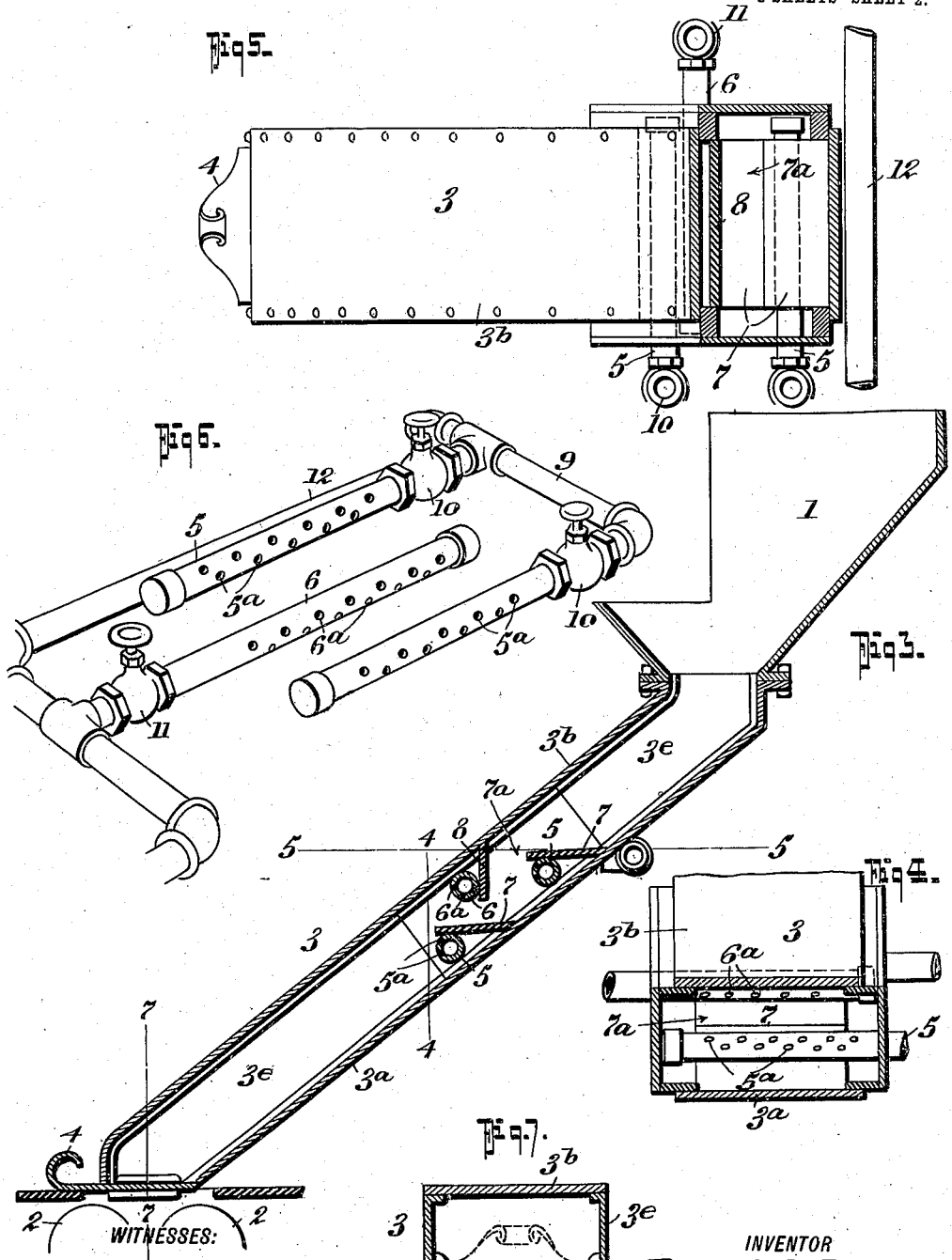

ROBERT R. JENSEN, OF BOULDER, COLORADO.

STEAMER AND COOKER.

No. 911,408.  Specification of Letters Patent.  Patented Feb. 2, 1909.

Application filed April 6, 1908. Serial No. 425,439.

*To all whom it may concern:*

Be it known that I, ROBERT R. JENSEN, residing at Boulder, in the county of Boulder and State of Colorado, have invented certain new and useful Improvements in Steamers and Cookers, of which the following is a specification.

My invention relates to certain new and useful improvements in steam grain cookers in which means are provided for cooking and steaming the grain while in transit from the bins to the rollers of the mill, and in its generic nature the invention comprises a chute or runway between the bins and the rolls wherein means are provided to cause the grain to turn over and over in its travel from the bins to the rolls, and means which act on the grain while so agitated to steam and cook the same.

More specifically my invention embodies those novel details of construction, combination and arrangement of parts all of which will be first fully described and then specifically pointed out in the appended claims and illustrated in the accompanying drawings, in which:—

Figure 1, is a perspective view of my invention showing the manner of its use. Fig. 2, is a plan view thereof. Fig. 3, is a central, vertical longitudinal section on the line 3—3 of Fig. 2. Fig. 4, is a section on the line 4—4 of Fig. 3. Fig. 5, is a horizontal section on the line 5—5 of Fig. 3. Fig. 6, is a detail perspective view of the steam pipes removed from the chute. Fig. 7, is a horizontal section on the line 7—7 of Fig. 3, showing the slide gate which regulates the flow of grain.

Referring now to the accompanying drawings in which like letters and numerals of reference indicate like parts in all of the figures, 1 designates the bin and 2 the rolls between which and the bin my invention is located.

My improved cooker comprises a chute or runway 3 into which the grain from the bin 1 passes, and from which the grain is passed to the rolls 2 through a slide valve or gate 4 located adjacent to the rolls or lower end of the chute 3. The chute 3 has a bottom wall $3^a$, a top wall $3^b$ and side walls $3^c$ and is held at an angle from 25 to 75 degrees to the horizontal in practice. Within the chute and adjacent to the bottom wall $3^a$ is a pair of suitably spaced perforated pipes which extend across the chute and between such pipes and adjacent to the top wall is a third pipe 6 that is perforated at $6^a$ while the pipes 5 are likewise perforated at $5^a$.

Coöperating with the pipes 5 and forming baffles thereover is a pair of plates 7—7 which lie almost horizontal although preferably slanting slightly from the wall $3^a$ at the center of the chute passage, the plates being less in width than the width of the chute passage to leave a grain passage between the front edges $7^a$ of the plates and the opposite or top wall $3^b$ of the chute. A vertical baffle 8, of similar form to the baffles 7 coöperates with the pipes 6 and thus by virtue of the baffles 5, 6 and 5, a zig-zag passage is formed through which the grain can pass in its travel from the bin to the rolls. The baffles 7—8 and 7 cause a rolling or turning over action to be imparted to the individual grains, which under the action of the steam from the pipes 5—6 and 5 are thoroughly steamed and cooked, the steaming and cooking taking place while the grains are tumbling over or are agitated as they pass over the baffles, thus making my cooker particularly adapted for cooking barley, oats, corn and the like.

The gate 4 regulates the flow of grain to the rolls, and hence also regulates the flow through the chute and incidentally through the cooking mechanism within the chute.

The pipes 5 pass to the outside of the chute and join with a main lateral 9, hand valves 10 being interposed, whereby the flow of steam may be controlled in the individual pipes to permit a more delicate adjustment of steam to be made, as conditions may make necessary. The lateral 9 connects with the main steam supply pipe 12 through a main shut-off valve 13, while the pipe 12 is connected with the pipe 6 within the chute through a control valve 11 for a purpose similar to that of the valve 10.

By providing the baffles to turn the grain over and over in its descent from the bin to the rolls, a very thorough steaming and cooking of each individual grain is made possible, thus preventing the grain, after it is rolled or flaked, from turning sour, owing to its being only partially cooked.

From the foregoing description taken in connection with the accompanying drawings it is thought the complete construction, operation and many advantages of my invention will be readily understood by those skilled in the art to which the invention appertains.

What I claim is:

In a cooker, an inclined chute, said chute having an entrant end vertically held to receive grain and having a discharge end to discharge the grain vertically downward, a valve in the discharge end for controlling the discharge of grain, a series of closely arranged steam pipes projecting transversely through the chute and parallel with one another and spaced away from the entrant and exit ends of the chute, said pipes being mounted in triangular form in cross section, certain of said pipes being held adjacent to the lower wall of the chute, and another of said pipes being held adjacent to the upper wall of the chute, baffles substantially horizontally mounted within the chute and inclining slightly downward over certain of said steam pipes and another baffle substantially vertically mounted within said chute against another of said steam pipes to form a zig-zag passage for the grain, said chute having portions of greater width adjacent to said pipes and baffles and caps held over the ends of said pipes within said portions of greater width.

ROBERT R. JENSEN.

Witnesses:
MELVIN C. GOSS,
ANNA D. THURSTON.